(12) United States Patent
Peeters et al.

(10) Patent No.: US 10,621,793 B2
(45) Date of Patent: Apr. 14, 2020

(54) LOCATION-BASED SERVICES

(71) Applicant: Titan Automotive Solutions NV, Leuven (BE)

(72) Inventors: Michael Peeters, Tourinnes-la-Grosse (BE); Claude Debast, Lembeek (BE); Tim Froidcoeur, Hoeilaart (BE)

(73) Assignee: Titan Automotive Solutions NV, Leuven (BE)

( * ) Notice: Subject to any disclaimer, the term of this patent is extended or adjusted under 35 U.S.C. 154(b) by 416 days.

(21) Appl. No.: 15/393,835

(22) Filed: Dec. 29, 2016

(65) Prior Publication Data

US 2017/0178415 A1 Jun. 22, 2017

Related U.S. Application Data

(63) Continuation of application No. 13/059,402, filed as application No. PCT/IB2009/053695 on Aug. 21, 2009, now Pat. No. 9,534,907.

(30) Foreign Application Priority Data

Aug. 22, 2008 (EP) ..................... 08105105

(51) Int. Cl.
| | | |
|---|---|---|
| *G07B 15/02* | (2011.01) | |
| *G07B 15/06* | (2011.01) | |
| *G01C 21/30* | (2006.01) | |
| *G01S 19/42* | (2010.01) | |
| *G06Q 20/14* | (2012.01) | |
| *H04L 29/06* | (2006.01) | |

(52) U.S. Cl.
CPC ............ *G07B 15/02* (2013.01); *G01C 21/30* (2013.01); *G01S 19/42* (2013.01); *G06Q 20/145* (2013.01); *G07B 15/06* (2013.01); *H04L 63/1458* (2013.01)

(58) Field of Classification Search
CPC ........ G07B 15/02; G07B 15/06; G01C 21/30; G01S 19/42; G06Q 20/145; H04L 63/1458
USPC .......................................................... 702/150
See application file for complete search history.

(56) References Cited

U.S. PATENT DOCUMENTS

| | | | | |
|---|---|---|---|---|
| 6,725,202 B1 * | 4/2004 | Hurta | ................... | G06Q 20/363 705/13 |
| RE38,626 E | 10/2004 | Kielland | | |
| 6,892,942 B1 * | 5/2005 | Widl | ...................... | G08G 1/017 235/384 |

(Continued)

FOREIGN PATENT DOCUMENTS

| | | |
|---|---|---|
| EP | 1 050 853 | 11/2000 |
| EP | 1 530 026 | 5/2005 |

*Primary Examiner* — Eman A Alkafawi
(74) *Attorney, Agent, or Firm* — Pearl Cohen Zedek Latzer Baratz LLP

(57) ABSTRACT

A location tracking unit for use with a location based service system is presented. The location tracking unit comprises: a navigation receiver adapted to implement a location tracking function; data processing means adapted to determine an occupied location according to a first location matching process, the first location matching process using navigation data from the navigation receiver and a first set of geographic data; and data processing means adapted to verify the integrity of the first location matching process based on a second location matching process using navigation data and a second set of geographic data.

25 Claims, 9 Drawing Sheets

(56) References Cited

U.S. PATENT DOCUMENTS

| | | | |
|---|---|---|---|
| 2002/0052689 A1* | 5/2002 | Yamashita | G01C 21/34 701/411 |
| 2005/0097018 A1* | 5/2005 | Takida | G06Q 20/102 705/35 |
| 2006/0200379 A1* | 9/2006 | Biet | G07B 15/063 705/13 |
| 2007/0117572 A1* | 5/2007 | Adam | G01S 5/0294 455/456.1 |
| 2008/0170074 A1* | 7/2008 | Beier | G01C 21/32 345/442 |
| 2009/0231161 A1* | 9/2009 | Malarky | G07B 15/063 340/933 |

\* cited by examiner

LOCATION-BASED SERVICES

CROSS-REFERENCE TO RELATED APPLICATIONS

This application is a continuation application of U.S. application Ser. No. 13/059,402, filed Feb. 16, 2011, which is a National Phase application of PCT International Application No. PCT/IB2009/053695, entitled "LOCATION-BASED SERVICES", International Filing Date Aug. 21, 2009, published on Feb. 25, 2010 as International Publication No. WO 2010/020966, which in turn claims priority from European Patent Application No. 08105105.4, filed Aug. 22, 2008, all of which are incorporated herein by reference in their entirety.

DESCRIPTION

This invention relates to location based service systems for implementing processes based on the location of a device.

Location based services rely on the integrated uses of telecommunications and informatics (otherwise known as "telematics").

The use of telematics with vehicles is currently a particular area of interest. For example, vehicle telematics systems may be used for a number of purposes, including collecting road tolls, managing road usage (intelligent transportation systems), tracking fleet vehicle locations, recovering stolen vehicles, providing automatic collision notification, location-driven driver information services and in-vehicle early warning notification alert systems (car accident prevention).

Road tolling is considered the first likely large volume market for vehicle telematics. Telematics is now beginning to enter the consumer car environment as a multimedia service box for closed services. These markets are still low in volume and are considered niche markets. The European Union, with the Netherlands as a leading country, has the intention to introduce road tolling as an obligatory function for every car from 2012 onwards.

So far, road tolling has been used for high way billing, truck billing and billing for driving a car in a certain area (e.g. London city). Toll plazas at which vehicles must stop are generally used, or else short range communications systems allow automatic debiting of a fund when a vehicle passes.

Future road tolling functions may impose the requirement of less (or no) infrastructure and may also impose tolling for every mile driven. It is envisaged that the vehicle will have a GPS system on board and a GSM (mobile telephony network) connection to enable information to be relayed to a centralized road tolling system.

The charging system in an automated road toll system can be based on distance travelled, the time, location and vehicle characteristics. The road tolling may apply to all vehicles or it may exclude certain classes of vehicle (for example with foreign number plates).

There is a need to increase the security of this type of system and to make fraudulent use of the system as difficult as possible.

Modern road pricing systems based upon GPS and GSM make use of the reception of the GPS satellite signals to determine the location, speed, etc. If the GNSS signals can be tampered, a user may be able to pretend to have driven on other (cheaper) routes. GPS test transmitters could conceivably be used for this purpose, with the test signals received by the vehicle's On Board Unit (OBU).

An OBU collects positioning information from a GNSS front-end, and performs different kinds of operations depending on the type of client application running inside, before transmitting the result(s) of the operations to a remote server. A processing-intensive operation is map matching which transforms a stream of GNSS coordinates into a list of locations or routes corresponding to the GNSS coordinates.

In a thin client of a road tolling system, the map matching and trip cost computation steps are performed by an external server, hence endangering the privacy of vehicle driver.

In a fat client scenario, it is the OBU that processes the GPS data to perform map matching. In a superfat scenario, the OBU undertakes all of the processing of a fat client OBU, but also undertakes the additional processing of trip cost computation, before transmitting the resulting trip cost to the road tolling server.

When compared to the fat or superfat client, the thin client has the advantage that the computation power needed by the OBU is low, and that only the tolling server needs to be updated when maps are updated.

Privacy, security and cost are important factors which must be carefully analyzed when designing such an OBU. Furthermore, signal tampering can occur along the signal decoding path of the receiver, probing and inserting fake information.

This invention is therefore concerned with the problem of making a remote device secure against attacks in cost-effective manner. It is known to make a remote device secure against physical tampering, but this is very expensive and difficult to achieve.

According to the invention, there is provided a location tracking unit for use with a location based service system comprising:

a navigation receiver adapted to implement a location tracking function;

data processing means adapted to determine an occupied location according to a first location matching process, the first location matching process using navigation data from the navigation receiver and a first set of geographic data; and data processing means adapted to verify the integrity of the first location matching process based on a second location matching process using navigation data and a second set of geographic data.

The invention may use first processing means to perform the location matching process which may be processing intensive. Verification of the location matching process can then be undertaken in secure data processing means. Since the processing requirements of the verification are much reduced when compared with the location matching process, the verification process is simple/small enough to be implemented using a secure controller such as those found in conventional smart cards. Embodiments therefore provide a high level of security and tamper resistance at low cost.

Embodiments may execute a "mini" process using a secure controller, such as an Automotive Telematics Onboard unit Platform (ATOP) Smart MX, as a mirror to the location matching process undertaken in the first data processing means so as to check whether or not the results match. Differing results may then provide proof of tampering in the first data processing means.

According to another aspect of the invention, there is provided a method of implementing a location tracking function in a location tracking unit, the method comprising:

determining an occupied location according to a first location matching process, the first location matching process using navigation data from a navigation receiver and a first set of geographic data;

verifying the integrity of the first location matching process based on a second location matching using navigation data and a second set of geographic data.

Examples of the invention will now be described in detail with reference to the accompanying drawings, in which:

FIG. 1 shows a road toll system to which the invention can be applied.

Figure 1:
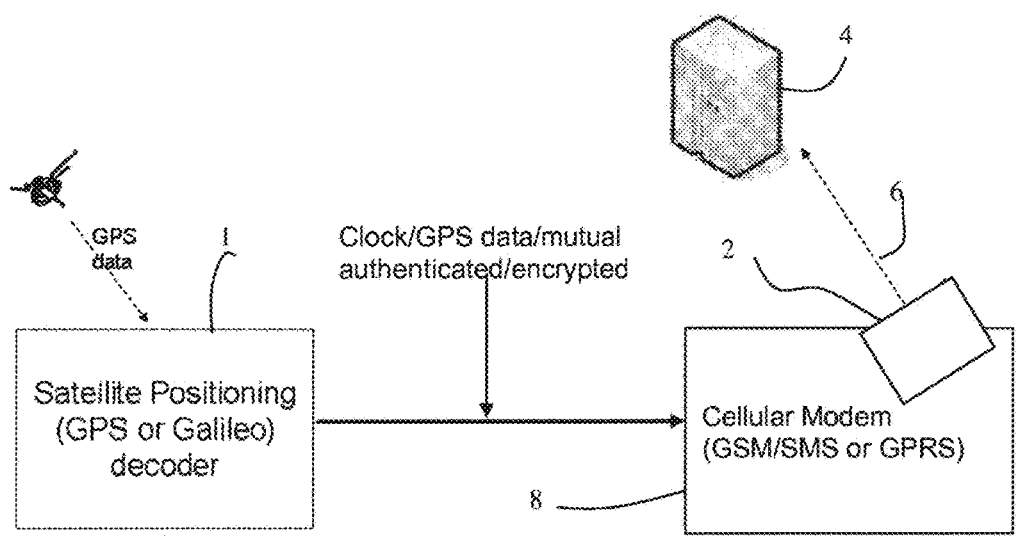
FIG. 1 shows a first example of road toll system which can use the system of the invention.

GPS data is captured by the GPS receiver 1. This data is decoded to position data (longitude-latitude). The position data together with timing (clock) data is stored in memory 2 in the form of a Smart card. Periodically a batch of stored data is sent to the back-end road tolling server 4, as shown by the batch download 6. This can be ideally done by a GSM function (General Packet Radio Service "GPRS" or Third Generation mobile telephony"3G") using a cellular modem 8. The back-end server is able to reconstruct out of this data the journeys that are driven.

The server 4 also contains a database of road prices which were valid at a certain time. Finally the total price is computed and the driver gets an invoice (e.g. monthly).

To prevent the data from being tampered by the user, data is exchanged in a cryptographic way (e.g. DES or 3DES) between the GPS decoder and the tamper resistant environment of the memory 2. A Smart card provides a good tamper proof environment.

If the total income from road tolling is to be approximately the same as the actual tax income from existing taxation, the average cost/km is very small. Each journey is thus very small, which means a continuous on-line transaction scheme may not be desirable, hence the desire for a batch download.

This type of transaction scheme is much in line with current known electronic purse schemes used by the banking world.

Privacy protection in such a system has previously been difficult. The system stores and transmits combinations of GSM, GPS and personal identity data to a central server system. Maintaining privacy protection means the security needs to be at a total end-to end system level, including the server infrastructure.

Figure 2:
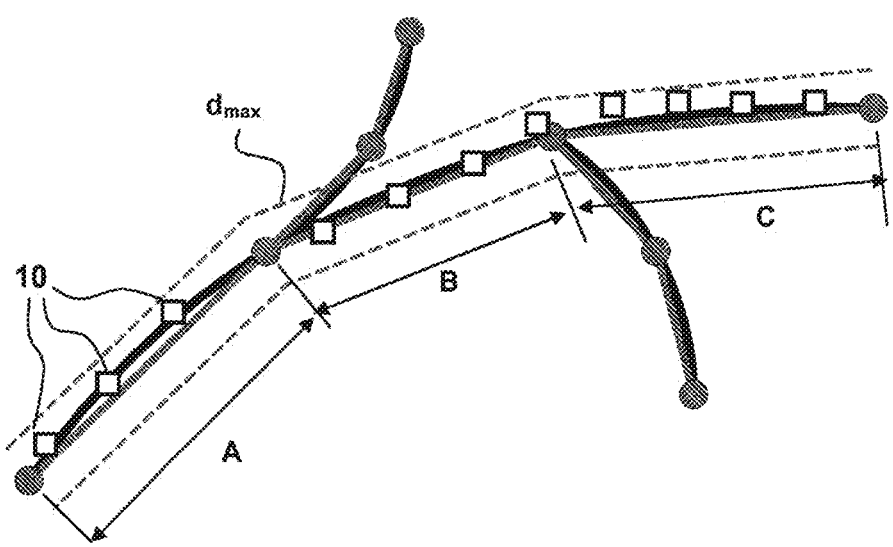
FIG. 2 illustrates a map matching process using GNSS fixes and the location of road sections.

This invention provides verification measures to verify map matching processes undertaken in a remote device. As illustrated in FIG. 2, such verification may be completed by checking whether or not the distance between the GNSS fixes 10 and the list of road sections A, B, and C, onto which these fixes are mapped, are below an acceptable threshold distance dmax.

Underlying embodiments of the invention is the concept of not carrying out the complete map matching process in a secure controller, but instead using a lightweight extra secure controller to verify, using trusted data, that the map matching process running in a host controller has been correctly executed. Thus, realizing it requires lots of CPU power to perform the map matching process, it is proposed that it is easier to verify afterwards that the output of the map matching process (i.e. the list of roads) corresponds to the submitted input data (i.e. the list of GNSS coordinates). Accordingly, the portion of the system/process which is required to be secured may be made small-enough to be implemented in a secure controller, such as those found in smartcards, thereby offering high level of tamper-resistance at low cost.

Figure 3:
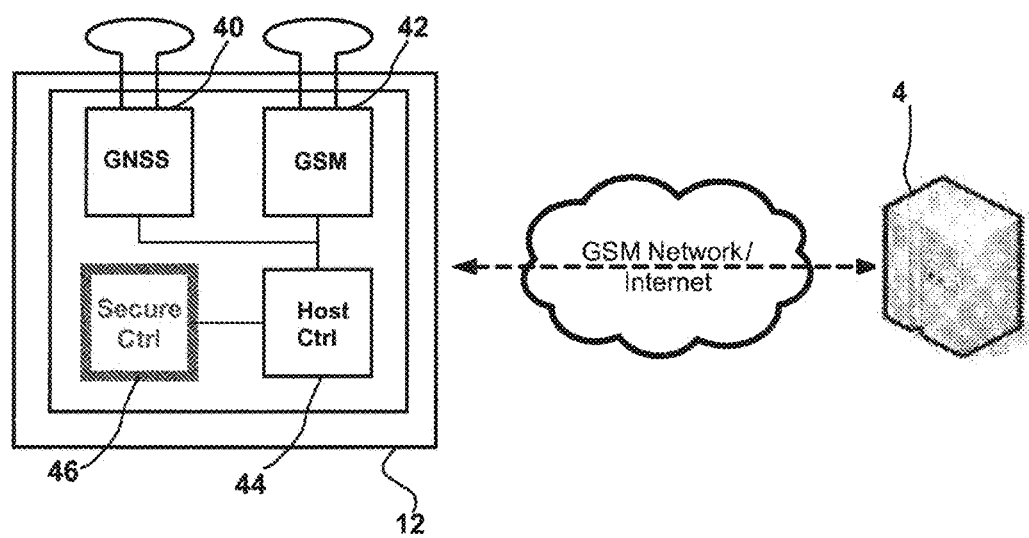
FIG. 3 is a schematic diagram of an Automotive Telematics Onboard unit Platform (ATOP) system according to an embodiment of the invention.

As an example application, an embodiment can be applied to a system made of a server and a remote device, and where the remote device comprises an Automotive Telematics Onboard unit Platform (ATOP) device, as illustrated in FIG. 3.

Referring to FIG. 3, the ATOP is a System-in-package component that contains mainly a GPS front-end 40, a 2.5G mobile modem 42, a baseband controller 44 and a very secure tamper-resistant controller 46 similar to those found in smartcards. The primary application target for the ATOP in Telematics is the implementation of an OBU 12. The ATOP supports all the security mechanisms required to secure such a thin client OBU. However, it is also possible to use the ATOP system to implement a "Fat" or "SuperFat" client OBU by connecting the ATOP to a more powerful controller that will run computation intensive processes, including map matching and cost computation for example.

Figure 4:
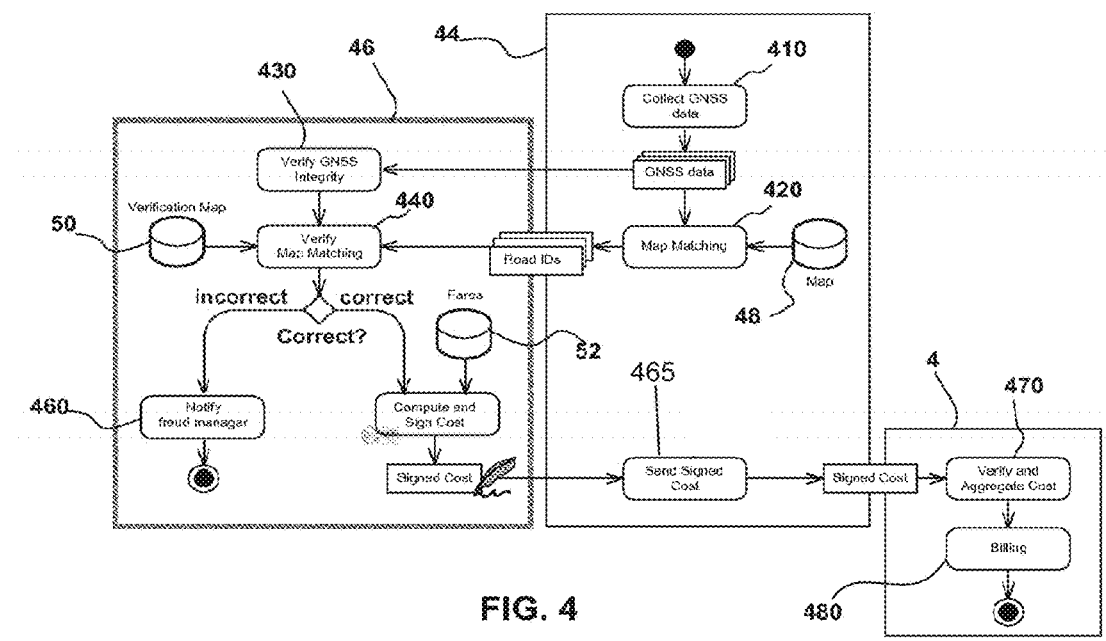
FIG. 4 is a flow diagram of a method according to an embodiment of the invention being implemented in the system of FIG. 3.

Referring now to FIG. 4, a process flow of a system implementing an embodiment of the invention is shown.

In FIG. 4, the ATOP is the main sequencer (or host controller) of the OBU 12. The ATOP collects the GPS data at regular intervals (step 410) and finds the best matching road sections (step 420), using information containing in the regular Map database 48. The result of this map matching process is a list of road section IDs, or similar.

The secure controller 46 first checks the integrity of submitted GNSS data (step 430), using techniques generally known in the art. By way of example, the secure controller 46 may verify that the GNSS data has been collected at regular intervals, and that the distance and timestamp delay between two subsequent GNSS fixes of the GNSS data is below a threshold value.

The secure controller will then undertake the step 440 of verifying, (a) that the submitted list of road sections IDs are indeed connected to each other (and connected to previously submitted road sections IDs), and (b) whether this list of road sections IDs correspond to the GNSS data. For this purpose it has access to a dedicated set of trusted data stored in a Verification Map database 50, which in turn is stored in the secure controller 46. In other words, the secure controller executes a mini process as a mirror to the map matching process to check whether or not the results are consistent. If the results are not consistent with those expected, there is evidence of tampering of the remote process.

If the verification (of step 440) succeeds, then the secure controller 46 computes, with the help of a database of fare data 52 securely stored in the secure controller, the cost that corresponds to the list of road IDs submitted to the secure controller 46 (step 450).

Alternatively, if the verification (of step 440) fails, the secure controller notifies its internal fraud manager in step 460. Here, the system is designed such that any notification to the fraud manager is always forwarded (either instantly or at regular/random intervals) to the server 4, and is this is done so in a secure way. The server 4 can then take appropriate action.

After completion of step 450, the total cost (or charging information) is signed by the secure controller 46 to indicate that the cost has been securely computed, and this signed cost is then forwarded to the server in step 465. The server then aggregates all costs for a given car after proper verification of their validity (step 470), and proceeds with the billing (step 480).

Figure 5:
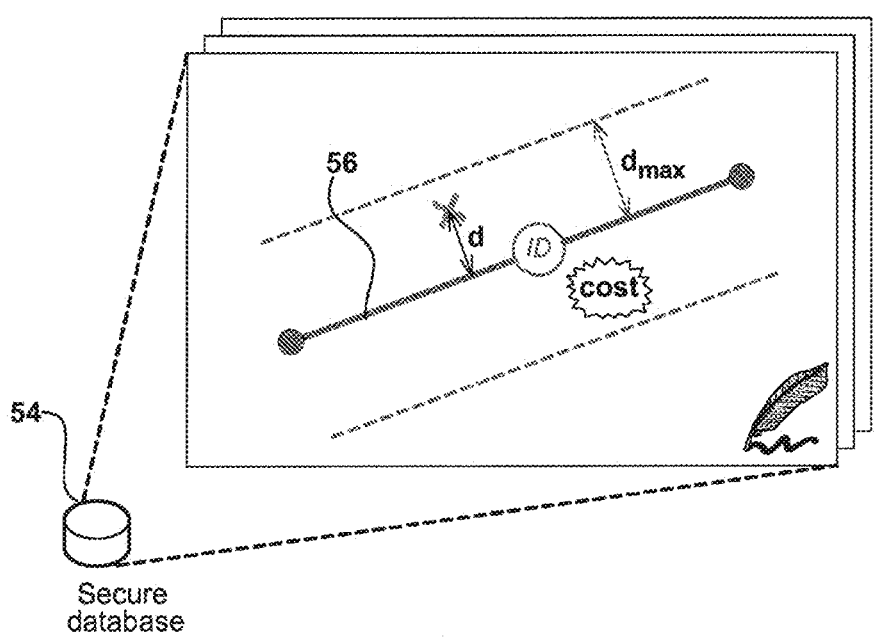
FIG. 5 illustrates the contents of a secure database and how such contents may be used according to an embodiment of the invention.

The main purpose of the Verify Map Matching process is to verify (a) the continuity of submitted road sections, and (b) that the submitted list of GNSS fixes are indeed mapped to the submitted path (identified as a list of road section IDs). The process has access to a secure database 54 (illustrated in FIG. 5) that contains, for each road section 56 (identified by a unique identifier ID):

geometric parameters needed to represent the road section (start point, end point, geometric shape . . . );

the maximum distance dmax at which a given GNSS fix can be from that road section to be considered as being correctly mapped on that section; and cost information required to compute the part of the trip cost due to the crossing of this road section at a given time.

It will be understood that the verification of the continuity of submitted road section ID is simple to complete using the information contained in the secure database, and so a detailed description of this is omitted. On the other hand, the verification that a given GNSS fix maps to a given road section is more delicate and will, therefore, be described in more detail below.

Variants Related to the Secure Database

It is of paramount importance that the integrity of the data inside the database 58 be protected and assured, since modifying such data may enable an attacker to eventually influence a trip cost for example. A solution to this problem is to store the database within the secure controller. An alternative solution is to store the database 58 inside the host controller 44 and protect the data in the database 58 with a cryptographically strong signature algorithm (as illustrated in FIG. 6).

Figure 6:
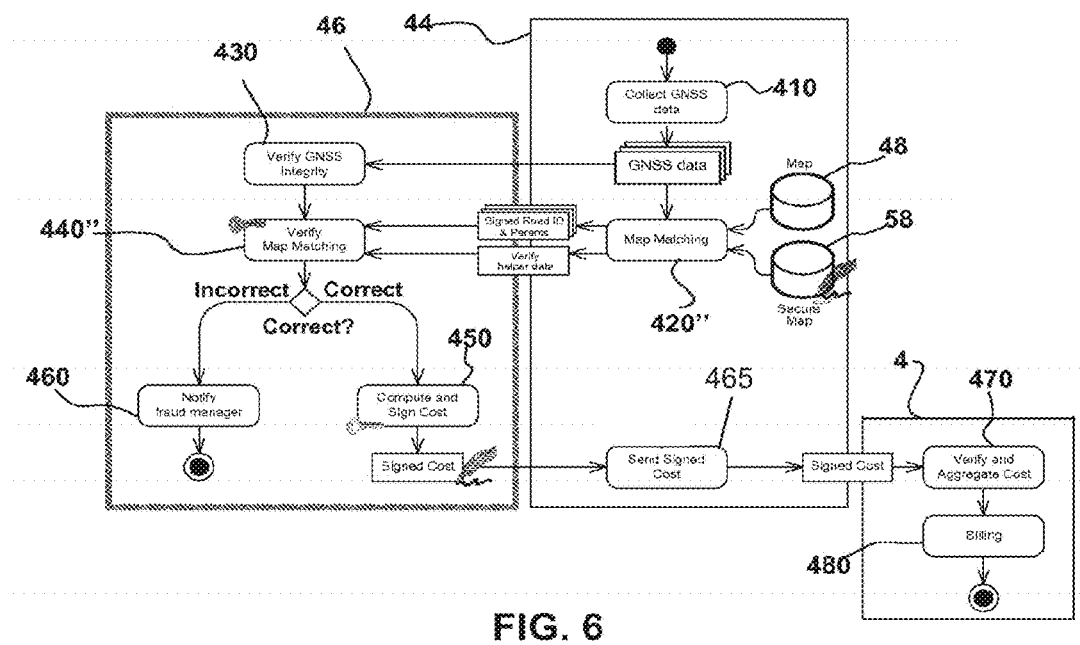
FIG. 6 is a flow diagram of a method according to an alternative embodiment of the invention.

Referring to FIG. 6, where the secure database is stored in the host controller 44, the map matching process (step 420") running in the host controller is modified to also provide to the secure controller 46, in addition to the list of road section IDs, the corresponding list of signed verification parameters (geometric parameters, distance, cost . . . ). The secure controller 46 will then first verify the validity of the signature on each security parameters before using these parameters to verify the map matching process in step 440". The secure controller 46 uses for this purpose a signature verification key, which can either be the RP Server Public Key (or similar) if the signature algorithm is based on public-key cryptography, or a symmetric secret key (like AES or 3-DES) that is shared between the secure controller 46 and server 4.

When the secure database is merged into the standard map matching database, the impact on the host controller 44 is minimal. In such an embodiment, the host controller 44 need only manage a single database of road section records, where each record is split into a pair of insecure and secure parts. The insecure part contains the usual information required to perform the map matching step, and the secure part contains the information required to verify the map matching step. A direct benefit of this solution is that the storage requirement for the secure controller 46 is drastically reduced since it doesn't need to store a database (and such a database may typically be several Megabytes (MB) in size). Also, the secure controller 46 is not required to be involved in an update procedure, meaning that an update of security parameters can simply be integrated in a standard mechanism that is used to update the (unsecure) map database 48, for example.

Also, since the host controller 44 has access to the secure database 58 that will be used for the verification process, the host controller 44 can implement some extra pre-computing steps to simplify further the task of the secure controller 46 (without compromising the security).

Variants Related to the Map Matching Verification

Figure 7:
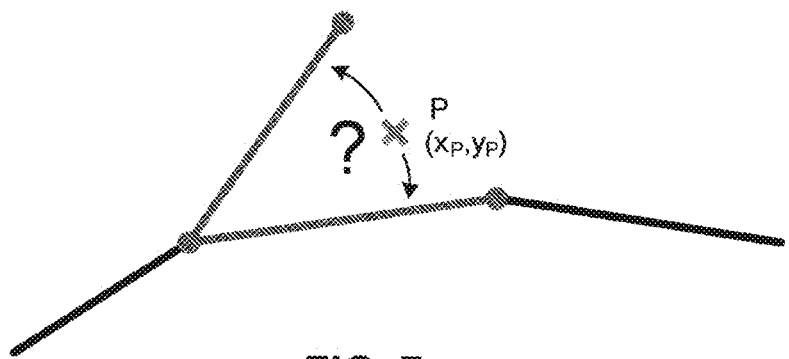
FIG. 7 illustrates the problem of mapping a GNSS point P to a road section.

A purpose of the Map Matching Verification process is to verify that a given GNSS point P (Xp,yp) is indeed mapped on a given road section (as shown in FIG. 7 for example). The actual computation steps undertaken by the secure controller 46 to verify this mapping may depend on how the road sections are geometrically represented in the secure database 58. Several variants of this representation and how the computation steps may be varied accordingly will now be detailed.

Correcting Spherical Coordinates for Distance Computation

GNSS coordinates are typically represented as a pair of spherical coordinates given by the longitude and the latitude of a point. It means that actual distance between two points (x0,y0) and (x1,y1) cannot be measured directly from these coordinates since the length of 1° longitude arc depends on the latitude. However, since road sections are very small with respect to the scale of the planet Earth, one can assume that this arc length is constant locally around the road section, and hence it suffices to apply a corrective proportional factor on the x coordinates before computing the distance.

To accommodate for this, a solution is to add in the secure map database 58 the corresponding corrective factor for each road section. However, it will be seen that some of the variants considered below are actually immune to this problem, and doesn't require such factor to be specified.

Using Straight Line Segments

Figure 8:
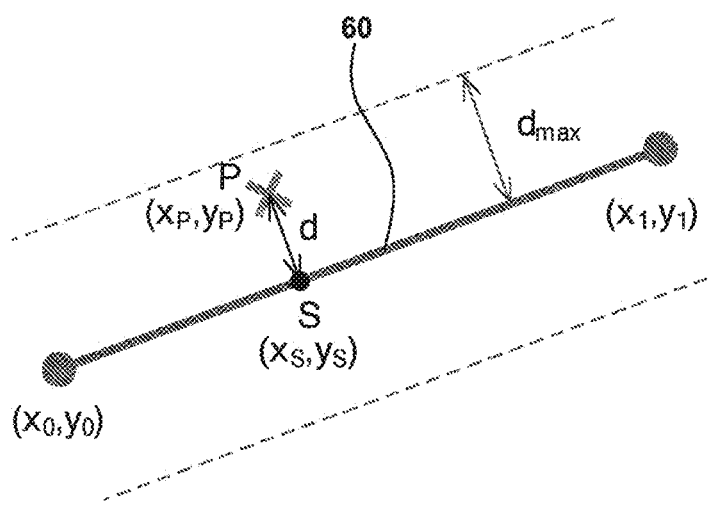
FIG. 8 is an illustration of how a road section is represented as a straight line according to an embodiment of the invention.

Referring to FIG. 8, in this case, a road section is represented as a straight segment joining two points given by the GNSS coordinates $(x_0,y_0)$ and $(x_1,y_1)$. A given GNSS point P $(x_P, y_P)$ is considered to be correctly mapped on a road section 60 if the distance d between this point P and the road section 60 is less than a specified threshold distance dmax. The distance d can be computed according to equation 1 as follows:

$$d = \frac{|(x_1 - x_0)(y_P - y_0) - (x_P - x_0)(y_1 - y_0)|}{\sqrt{(x_1 - x_0)^2 + (y_1 - y_0)^2}} \leq d_{max}. \quad (1)$$

Equation 1 above can be greatly simplified by observing that the denominator is actually independent of the point P, and hence can be moved to the right side (also constant). Isolating further the variable part depending on the point P $(x_P, y_P)$, we see that the actual test that must be undertaken by the secure controller 46 is given by a formula of the kind: $A \cdot x_P + B \cdot y_P + C \leq D$ where A are $(=y_0 - y_1)$, B $(=x_1 - x_0)$, C $(=x_0 y_1 - x_1 y_0)$ and D $(=d_{max} \cdot \sqrt{A^2 + B^2})$ are constant parameters for the given road section 60 and threshold distance dmax.

The test above assumes a road section of infinite length. For completeness, the secure controller 46 may take into account the limited length of the actual road segment. This can be done by verifying that the projected point S $(x_S, y_S)$ is between the section vertices $(x_0, y_0)$ and $(x_1, y_1)$. Put more simply, accommodating a reasonable loss of precision, this can be done by verifying that the point P $(x_P, y_P)$ is within a rectangle area surrounding the target road segment: $x_{min} \leq x_P \leq x_{max}$ and $y_{min} \leq y_P \leq y_{max}$, where $x_{min}$, $x_{max}$, $y_{min}$ and $y_{max}$ are also constant parameters stored along with the other parameters for the targeted road segment.

It should be noted that this variant does not require the provision of an independent corrective proportional factor to deal with spherical coordinates, since this factor can be directly integrated in the segment parameters A, B, C and D.

Using Splines

Figure 9:
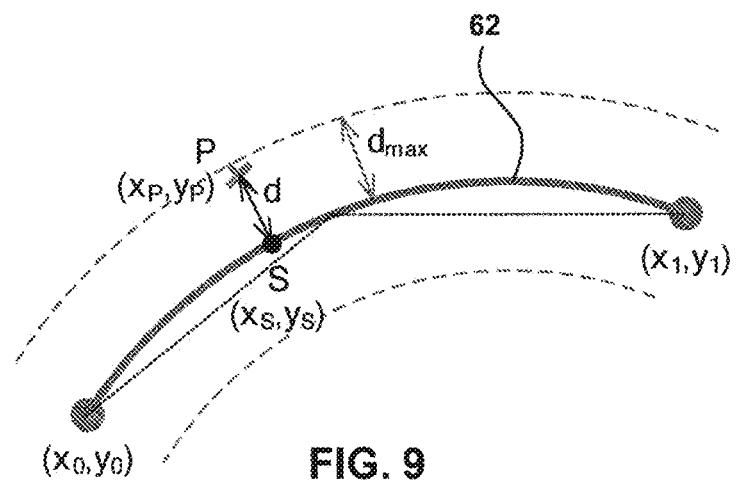
FIG. 9 is an illustration of how a road section is represented as a plurality of splines according to an embodiment of the invention.

Referring now to FIG. 9, curved roads can be approximated using a succession of smaller straight segments following the original curved road. Thus, an option is to represent a curved road 62 using splines, and in particular cubic splines. Cubic splines for a set of n+1 points are usually represented as a set of parametric equations:

$$y_i(t) = a_i + b_i t + c_i t^2 + d_i t^3 \quad (2)$$

where t is a parameter $t \in [0,1]$ and $i = 0, \ldots, n-1$. Varying the parameter variable t within the interval [0,1] allows the generation of the coordinates of all points belonging to the spline. For example, in FIG. 9, $y_0(0) = a_0 = (x_0, y_0)$ and $y_0(1) = a_0 + b_0 + c_0 + d_0 = (x_1, y_1)$.

The computation of the distance d requires first the determination of the point S, which is the nearest point on the spline to the GNSS fix point P. This is not necessarily a straightforward task. One method may be iterative, aiming at approximating more and more precisely the coordinates of the point S. Such a method is not adapted to a lightweight secure controller such as what is preferred in embodiments of the invention. However, assuming that the secure map is stored in the host controller 44, a solution can be applied where the host controller 44 will actually assist the secure controller 46 without compromising the security. This is done in the following two steps:

1. First the host controller 44 computes the position of the point S, and then forwards to the secure controller 46 the value of the spline parameter t corresponding to that point on the spline $(t = t_S)$ 2. Secondly, the secure controller 46 computes the position of the point S using the parametric representation of the spline (see equation 3), and verifies whether the distance d=|PS| is less the threshold distance dmax (according to equation 4 below):

$$(x_S, y_S) = y_0(t_S) = a_0 + b_0 t_S + c_0 t_S^2 + d_0 t_S^3 \quad (3)$$

$$(x_S - x_P)^2 + (y_S - y_P)^2 \leq d_{max}^2 \quad (4).$$

This concept of assistance from the host controller 44 can be applied in other variants in order to simplify the processing undertaken by the secure controller 46. Care must be taken, however, that such assistance does not compromise the security of the system. It is also noted that the secure controller 46 does not need to compute $d_{max}^2$ since it can be pre-computed beforehand and stored as is in the secure database 58.

This embodiment does not require an independent corrective proportional factor to deal with spherical coordinates since it can be directly integrated in the spline parameters.

Using Polygons

Figure 10:
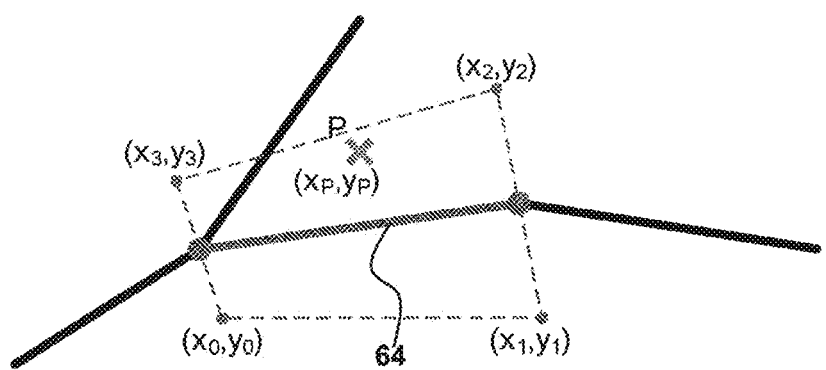
FIG. 10 is an illustration of how a road section is represented as a polygon according to an embodiment of the invention.

Referring to FIG. 10, in the case of using polygons, a given point P $(x_P, y_P)$ is considered to be mapped on a given road section 64 if P is within a polygon surrounding the section.

Assuming a convex polygon identified by N vertices $(x_i, y_i)$ $(0 \leq i < N)$ numbered following anti-clockwise convention, one can verify that the point P identified by the vector $v_P$ is inside the given polygon by checking that the following (partial) vector cross-products are all positive:

$$(x_{i+1} - x_i)(y_P - y_i) - (y_{i+1} - y_i)(x_P - x_i) \geq 0 (\forall 0 \leq i < N) \quad (5),$$

where all indices are to be taken modulo N.

The corrective factor for dealing with spherical coordinates is not required in this variant. The only impact is that polygon segments will actually deviate from an terrestrial geodesic by a negligible amount.

Using a Series of Circles or Squares

Figure 11:
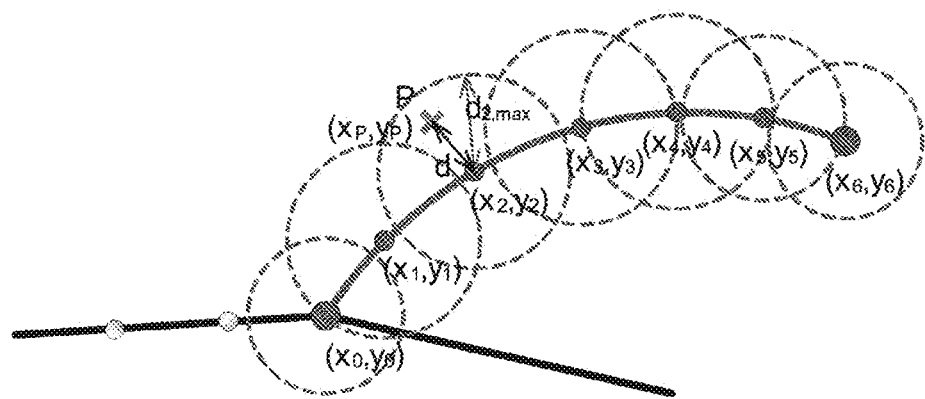
FIG. 11 shows how a road section is represented as a series of circles according to an embodiment of the invention.

The verification that a given GNSS point P $(x_P, y_P)$ is d mapped on a given road section can be done using a series of circles along the road section (see FIG. 11).

In this case, a given GNSS fix point P $(x_P, y_P)$ is considered to be correctly mapped to a given road section if the given point P is inside at least one of the circles associated with the road section. For example, with a road section associated with N circles of centre $(x_i, y_i)$ $(0 \leq i < N)$ and threshold radius $d_{i,max}$, a given point P $(x_P, y_P)$ will be considered as mapping to the road section if the equation 6 below is satisfied:

$$\exists i \in 0, \ldots, N-1 : (x_i - x_P)^2 + (y_i - y_P)^2 \leq d_{i,max}^2 \quad (6).$$

To reduce processing for the secure controller, it is noted that the actual value of i can be forwarded by the host controller 44, along with the other secure parameters, without compromising the security in any way.

An alternative solution is to adapt the variant so that to consider a series of ellipses instead. In that case, the proportional factor for dealing with spherical coordinates can be integrated in the ellipse axes.

Figure 12:
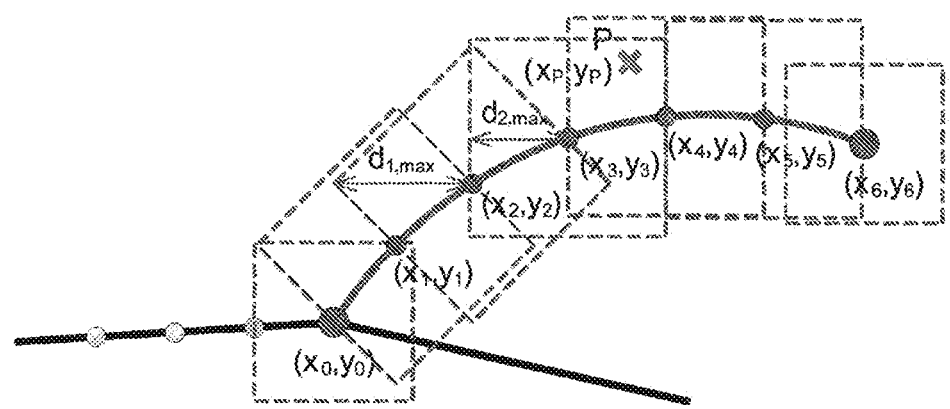
FIG. 12 shows how a road section is represented as a series of overlapping polygons according to an embodiment of the invention.

Similarly, a series of square can be used as illustrated in FIG. 12, which simplifies the verification step at the cost of some loss of precision.

For example, with a road section associated with N square of centre $(x_i, y_i)$ $(0 \leq i < N)$ and edge length $2d_{i,max}$ (diagonal length for 45°-rotated square), the secure controller must only verify that:

$$\exists i \in 0, \ldots, N-1 : \begin{cases} |x_i - x_P| \leq d_{i,max} \text{ and } |y_i - y_P| \leq d_{i,max} & \text{for standard square} \\ |x_i - x_P| + |y_i - y_P| \leq d_{i,max} & \text{for a 45° rotated square} \end{cases}$$

As for circles, the actual index i to use can be given by the host controller, hence reducing further the processing, without compromise of the security.

An alternative solution may be to consider a series of rectangles (instead of squares) or rhombuses (instead of 45°-rotated square), and specify independently the length of big and small sides (big and small diagonals in the case of rhombuses).

Statistics and Confidence Value

GNSS receivers are typically quite sensitive to the environment where the GNSS fixes are collected. For example, received GNSS fixes are typically influenced by the weather conditions, by the presence of obstacles that reduce the strength of the satellite signals or prevent the reception of these signals, and also by the proximity of buildings that can reflect these signals (multipath problem). The net result of this sensitivity is that GNSS fixes can differ from an actual position. Preferably, the map matching process reduces the impact of these divergences, by finding the best matching road section in the vicinity of the collected GNSS fixes.

However, the apparent noise on the GNSS signal may sometimes be so significant that the distance between the GNSS fix and the best matching road section is greater than distance threshold dmax specified in the secure map database 58. Thus, without appropriate measures, the secure controller 46 may consider such situations as fraud attempts and notify the server accordingly, whereas actually they are due to bad reception conditions. It is therefore preferable to address this issue, since a high rate of false positives is unacceptable. Three mechanisms designed to address this issue will now be described below, all of which maintain the privacy-preserving property of the client OBU.

1. Statistical Analysis

Instead of notifying immediately the RP server for each mismatch, the secure controller will actually perform statistics on the result of the map matching process.

For instance, the secure controller 46 maintains a trip average percentage of successful verification. This trip average is transmitted along with the cost information for a given trip to the server 4. The server 4 can then take appropriate measures if such percentage is below a specified threshold value. Alternatively, the secure controller 46 may also notify an internal fraud notification manager if such percentage is below the given threshold. In this case, the fraud notification may, besides notifying the server 4, also inform a user (such as a driver of a vehicle housing the OBU) that a problem has been detected and that a predetermined person or organisation should be contacted.

Secondly, the secure controller 46 also maintains a moving percentage of successful verification over the last N submitted verification requests. In the case this value falls below a threshold value, the secure controller 46 notifies a fraud manager as described above.

2. Use of Reliability Information

Further refinement can be achieved by including GNSS reliability information in the secure map database 58. Since part of the mismatch between a GNSS fix and the actual vehicle position is due to the road or urban infrastructure, which is constant for a given road section. The impact of the infrastructure can be estimated or measured, and the secure data for each road section can be completed with this information.

For instance, the distance threshold dmax can be defined for each road section separately, taking into account the influence of the surrounding infrastructure. The distance is increased in zones of typical bad reception, and decreased in zones of good reception in order to obtain the best detection sensitivity.

Alternatively or additionally, the secure database may also contain a reliability factor for each road section, which will moderate the effect of a failed verification on the success percentage described in the previous mechanism.

3. Signal Interruption Statistics

The third mechanism deals with the issue of lost of signal reception. In this case, the secure controller 46 will detect that there is an interruption between two GNSS fixes (for instance by observing that the distance between two such fixes are too big, or that the timestamp of each fix is above a given threshold). Instead of notifying a fraud manager immediately, the secure controller 46 can also maintain statistics on such interruptions.

The secure controller 46 can maintain a history of such signal loss per trip, ie. the number of losses, the interruption distance and delay, and optionally time of occurrence (time of last valid fix before interruption). The complete history can then be transmitted to the server 4 along with the cost information for a given trip, or alternatively the secure controller 46 may only transmit a set of statistic values (average, accumulation, standard-deviation). In the case of abnormally big interruption, the secure controller may trigger the fraud manager, which then contact the server immediately, and/or notify the driver accordingly.

Furthermore, as for the previous two mechanisms, the secure database 58 may contain extra information that specifies the location and geometric information of zones that are more susceptible to signal losses (tunnels, forests . . . ). In case of signal loss, this information is used by the secure controller to verify that the last received GNSS fix and the next first valid GNSS fix is indeed in a region identified as being prone to signal loss, and adapt the statistics accordingly (for example, by maintaining separate statistics of losses in clear areas and those in obstructed areas).

Dealing with Denial-of-Service Attacks

In the case the secure map database is stored outside the secure controller, as has been described for some embodiments, the secure controller 46 has no means to verify that a submitted GNSS fix is not on a tolled segment or within a tolled region. Indeed, some road sections or zones can be within private areas that are not subject to tolling. An attacker could then modify the process running on the host controller 44 to transmit (albeit correct) GNSS fixes to the secure controller and inform the secure controller that there is no matching tolled road section.

The following mechanisms can be implemented to counter such attack.

First, the secure controller 46 can enforce the collection of GNSS fixes at regular intervals, and detect when GNSS fixes are missing. This can be done, for instance, by checking that the distance between two subsequent GNSS fixes and the delay between two GNSS timestamps are both below a maximum value. In case of abnormal interruption of GNSS transmission, the secure controller notifies the internal fraud manager.

Second, the secure database can be implemented so that all un-tolled zones are covered by appropriate toll free zones. Such toll free zones (represented using polygon shapes for example) are added such that a given point at any location is either included in a tolled zone/section or in a toll free zone, and such that toll free zone do not overlap tolled zones (or at least only by a negligible amount).

Third, the secure controller 46 can verify that each regularly collected GNSS fix is indeed associated with a zone/section, either tolled or toll-free. Due to complete but disjoint coverage by tolled and toll-free zones, it is not possible for a hacked host controller to pretend that a given GNSS fix is not in a tolled zone when it is actually within a tolled zone, since the host controller will not be able to provide the toll-free zone corresponding to the submitted GNSS fix.

The invention has been described in connection with single frequency GPS, but other GNSS systems (GLONASS, Galileo etc) would be similar. Indeed the techniques could also be applied to multiple frequency systems, with appropriate means of capturing the IF data from each carrier.

Various additional features and modifications will be apparent to those skilled in the art.

The invention claimed is:

1. A location tracking unit configured for use with a location based service system comprising:
   a first data processor configured to determine an occupied location according to a first location matching process, the first location matching process using navigation data from a navigation receiver and a first set of geographic data; and
   a second data processor configured to verify integrity of the first location matching process based on a second location matching process using the navigation data and a second set of geographic data;
   wherein the first data processor is a host controller and the second data processor is a secure controller.

2. The location tracking unit of claim 1, wherein the second data processor executes the second location matching process as a mirror to the first location matching process undertaken in the first data processor to check whether or not the results of the first and second location matching processes match.

3. The location tracking unit of claim 1, wherein the second data processor is configured to verify the integrity of the first location matching process by verifying the continuity of road sections output by the first location matching process.

4. The location tracking unit of claim 1, wherein the second data processor is configured to verify the integrity of the first location matching process by checking whether or not distances between coordinates of the navigation data and road sections onto which these coordinates are mapped is below a threshold distance.

5. The location tracking unit of claim 4, wherein the distances between spherical coordinates are corrected by applying a corrective proportional factor before computing the distances.

6. The location tracking unit of claim 4, wherein a road section is represented as a straight line joining two distinct locations, wherein a coordinate of the navigation data is considered to be correctly mapped onto a road section if the distance between the coordinate and the straight line representing the road section is below a threshold distance.

7. The location tracking unit of claim 4, wherein a road section is represented as a plurality of splines, and wherein the first data processor is configured to compute a position on a spline that is nearest to the coordinate of the navigation data and forward to the second data processor a parameter value of the spline position; and the second data processor is configured to compute the position on the spline using the parameter value and verify whether a distance between the coordinate submitted by the navigation receiver and the spline position is below a threshold distance.

8. The location tracking unit of claim 4, wherein a road section is represented as a polygon, wherein a coordinate of the navigation data is considered to be correctly mapped onto a road section if the coordinate is within a polygon surrounding the road section.

9. The location tracking unit of claim 4, wherein a road sections is represented as a series of overlapping circles or ellipses, wherein a coordinate of the navigation data is considered to be correctly mapped onto a road section if the coordinate is inside at least one of the circles or ellipses associated with the road section.

10. The location tracking unit of claim 4, wherein a road section is represented as a series of overlapping squares, rectangles or rhombuses, wherein a coordinate of the navigation data is considered to be correctly mapped onto a road section if the coordinate is inside at least one of the squares, rectangles or rhombuses associated with the road section.

11. The location tracking unit of claim 1, wherein the second data processor is further configured to perform statistics to determine if a mismatch between the first and second location matching processes is due to a fraud attempt or to reception conditions.

12. The location tracking unit of claim 11, wherein the second data processor maintains a trip average percentage of successful verification, which triggers a fraud notification if the percentage is below a threshold value.

13. The location tracking unit of claim 11, wherein the second data processor maintains a moving percentage of successful verifications over a number of submitted verification requests, which triggers a fraud notification if the percentage is below a threshold value.

14. The location tracking unit of claim 1, wherein the second data processor is further configured to verify integrity by using reliability information.

15. The location tracking unit of claim 14, wherein the threshold distance is increased in zones of typically bad reception and decreased in zones of typically good reception.

16. The location tracking unit of claim 14, wherein a reliability factor for each road section will moderate the effect of a failed verification on a success percentage.

17. The location tracking unit of claim 1, wherein the second data processor is further configured to maintain statistics related to signal interruptions, wherein an above threshold interruption causes the second data processor to trigger a fraud notification.

18. The location tracking unit of claim 1, wherein the second data processor is further configured to counter a denial-of-service attack in which an attacker falsely indicates that a coordinate of the navigation data is not on a tolled road section.

19. The location tracking unit of claim 18, wherein the second data processor is configured to verify that a distance between two subsequent navigational coordinates and a delay between two navigational timestamps are both below a maximum value.

20. The location tracking unit of claim 18, wherein the location tracking unit is configured to store a secure database in which all un-tolled zones are covered by toll free zones.

21. The location tracking unit of claim 18, wherein the second data processor is configured to verify that that each navigational coordinate is associated with a tolled zone or a toll-free zone.

22. The location tracking unit of claim 1, further comprising a database configured to store the second set of geographic data inside a secure controller.

23. The location tracking unit of claim 1, further comprising a database configured to store the second set of geographic data according to an encryption algorithm inside a host controller.

24. The location tracking unit of claim 23, wherein the database splits each data record into a pair of insecure and secure parts, wherein the insecure part comprises information used to perform the first location matching process, and the secure part comprises information used to verify the first location matching process.

25. The location tracking unit of claim 23, wherein the first data processor is configured to further provide to the second data processor signed verification parameters, and the second data processor is configured to first verify the validity of the signature on each verification parameter before using the verification parameters to verify the first location matching process.

* * * * *